3,339,661
MULTIPLE WHEEL DRIVE VEHICLES WITH MEANS PREVENTING TORQUE BEING TRANSMITTED BACK TO THE ENGINE
Claude Hill, Kenilworth, and Anthony P. R. Rolt, Stratford-on-Avon, England, assignors to Harry Ferguson Research Limited
Filed Apr. 21, 1965, Ser. No. 455,033
Claims priority, application Great Britain, Apr. 21, 1964, 16,428/64
6 Claims. (Cl. 180—44)

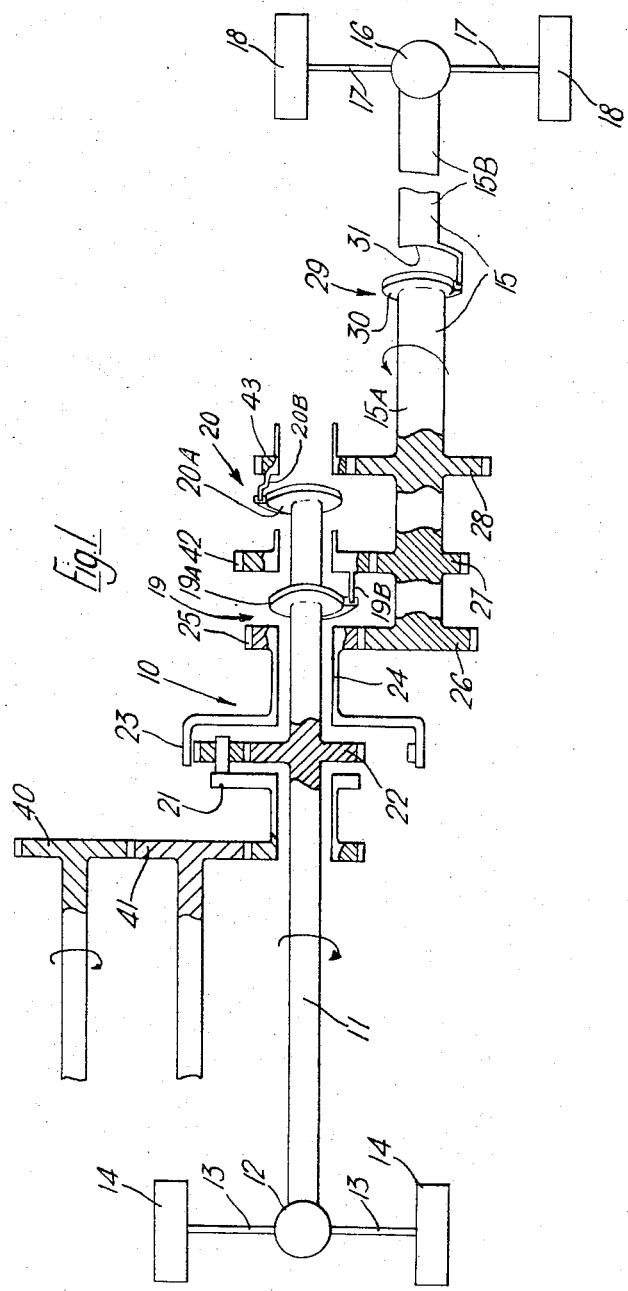

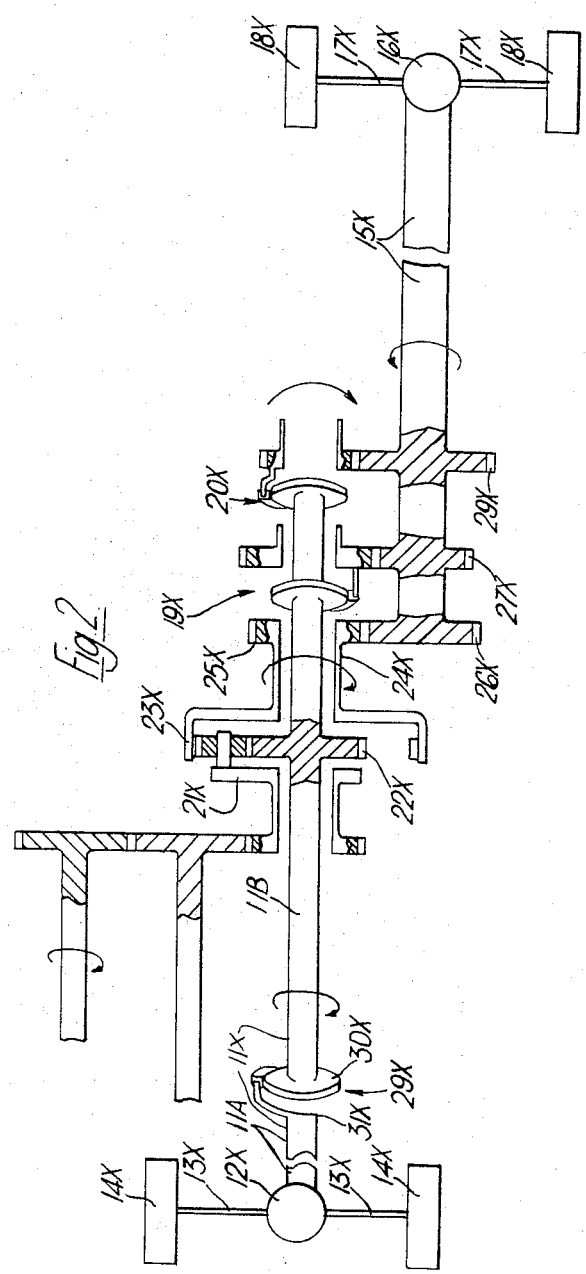

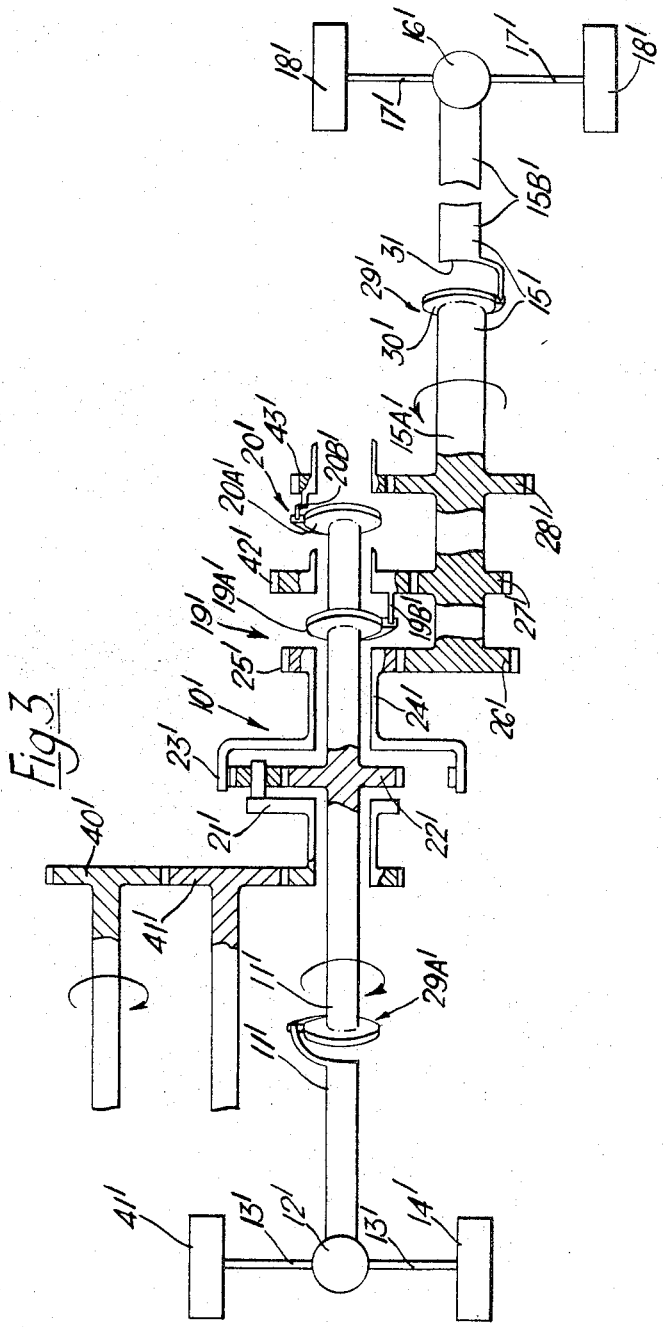

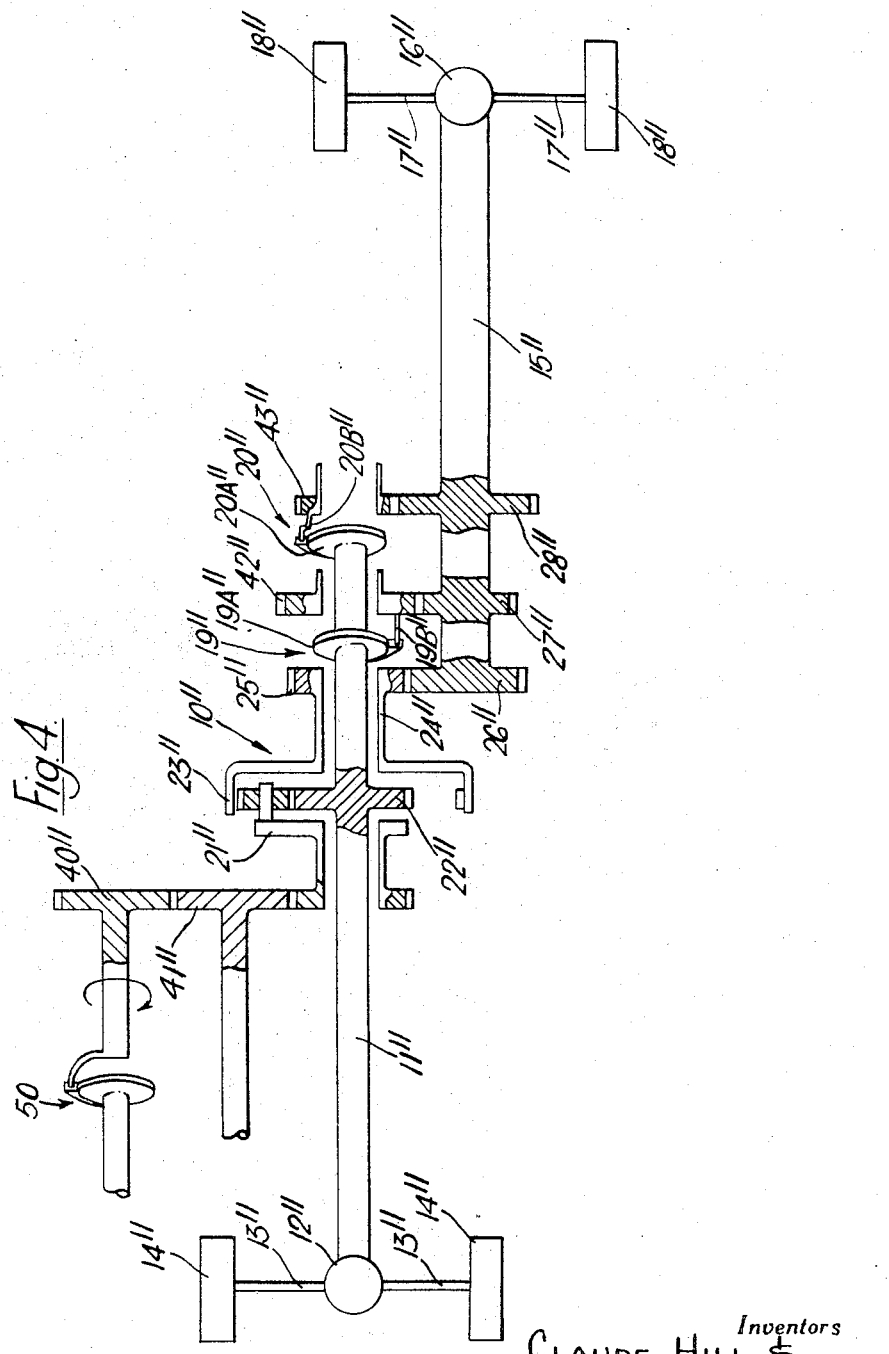

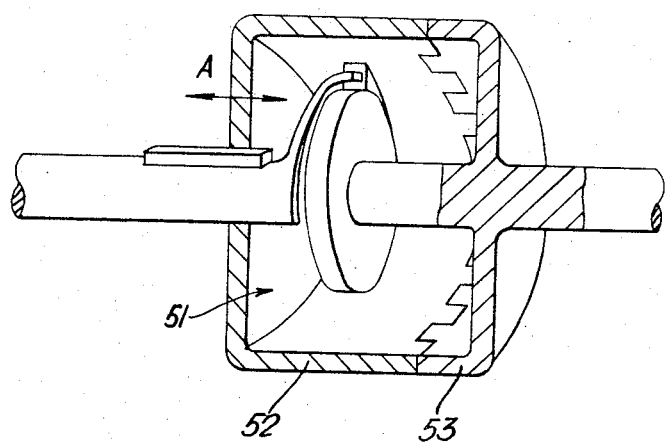

This invention relates to a vehicle transmission in which all of the roadwheels are driven.

It is an object of the present invention to provide, in an all wheel drive vehicle, a transmission which is so arranged that whenever the vehicle wheels overrun the engine, at least one pair of road wheels is prevented from transmitting torque back to the engine.

According to the present invention there is provided a vehicle transmission for an all wheel drive vehicle having an engine, said engine having an output, and said transmission having a centre differential having an input and two outputs and means to limit difference in speed between said last mentioned two ouputs to a predetermined value, a first driving connection between the engine output and the centre differential input, a front differential gear having two outputs adapted to be respectively drivingly connected to a pair of front ground wheels, a rear differential gear having two outputs adapted to be respectively drivingly connected to a pair of rear ground wheels, a front driving connection between the front differential gear and one output of the centre differential gear, a rear driving connection between the rear differential gear and the other output of the centre differential gear, and one-way clutch means in at least one of said driving connections which disengages when the vehicle wheels overrun the engine, so that at least one pair of road wheels is prevented from transmitting torque back to the engine.

Embodiments of the invention will now be described, simply by way of example, with reference to the accompanying drawings in which:

FIG. 1 is a diagrammatic layout of a vehicle transmission according to the invention, and FIG. 2 is a layout similar to FIG. 1 showing a modification of the invention.

FIGS. 3 and 4 are further layouts similar to FIG. 1 showing two further modifications of the invention.

FIG. 5 is a diagrammatic representation of one-way clutch with locking means.

Referring more specifically to FIG. 1, a vehicle transmission comprises a controlled centre differential gear indicated by 10, having a front driving connection in the form of a front propeller shaft 11 to a front differential gear 12 which has two output half shafts 13 respectively drivingly connected to a pair of front ground wheels 14. A rear driving connection in the form of a rear propeller shaft 15 drivingly connects the centre differential 10 and a rear differential gear 16 having two output half shafts 17 respectively drivingly connected to a pair of rear ground wheels 18.

The centre differential gear 10 is controlled, that is, it is constructed so that if a predetermined speed difference occurs between the front and rear propeller shafts 11 and 15 the centre differential gear 10 locks to limits the speed difference to the predetermined value. In the arrangement shown, the centre differential gear 10 employs two free wheels, 19 and 20, which are one-way clutches each having an under-running member and an over-running member. To allow differential action to take place, the centre differential gear 10 has an epicyclic gear train, of which the planet carrier 21 is driven from the vehicle engine (not shown) through the usual change speed gearbox (not shown), disengageable clutch (not shown) and gears 40 and 41; the sunwheel 22 is integral with the front propeller shaft 11, and the annulus 23 is integrel with and at one end of a rotatable sleeve 24 which has a gearwheel 25 formed at the other end thereof meshing with a gearwheel 26 secured on the rear propeller shaft 15.

The front propeller shaft 11 extends through the sleeve 24 and the extended portion carries the over-running member 19A of a one-way clutch 19 and an under-running member 20A of a one-way clutch 20. The under-running member 19B of the one-way clutch 19 and the over-running member 20B of the one-way clutch 20 are respectively driven from two gearwheels 42 and 43 rotatably mounted and respectively meshing with gearwheels 27 and 28 secured to the rear propeller shaft 15.

The arrangement is such that, during normal forward travel of the vehicle, the over-running members 19A and 20B of the one-way clutches 19 and 20 are driven at a speed higher than their respective under-running members 19B and 20A and differential action between the front and rear propeller shafts 11 and 15 can take place. That is to say, the gear ratio between gearwheels 27 and 42 is slightly less than that between gearwheels 26 and 25, whereas the ratio between gearwheels 28 and 43 is slightly greater. However, when excess differential action between shafts 11 and 15 occurs, say for example when the rear wheels 18 lose a substantial amount of grip with the ground and start to spin, the speed of the under-running member 19B of the one-way clutch 19 increases until eventually the one-way clutch 19 locks and thereby locks the epicyclic gear in that the sunwheel 22 and annulus 23 are constrained to rotate in a ratio fixed by the gear ratios of wheels 26, 25 and 27, 42 to which they are now secured, and torque is still transmitted to the wheels which are still gripping the road surface. A similar action occurs when the front wheels 14 lose adhesion but in this case one-way clutch 20 locks.

In addition to the one-way clutches 19 and 20 a one-way clutch 29 is provided in the driving connection between the rear differential gear 16 and the centre differential gear 10. In the construction of FIG. 1, the rear propeller shaft 15 is split into a front part 15A and a rear part 15B, the gearwheels 26, 27 and 28 being secured to the front part 15A, and the under-running member 30 and the over-running member 31 of the third one-way clutch 29 are respectively connected to the adjacent ends of the front and rear parts of the rear propeller shaft 15 so that when drive is being transmitted through the front part 15A to the rear part 15B, and the vehicle is moving forward, the third one-way clutch is locked. If all four ground wheels attempt to overrun the engine, for example when running down a hill, the rear wheels overrun and therefore, the one-way clutch 29 disengages in that the member 31 overruns. Thus, there is no reaction of the torque delivered to the annulus 23 which tends to speed up, with a corresponding increase in speed of the front part 15A of the rear propeller shaft 15. This can continue only until the one-way clutch 20 locks, causing part 15A to run at a lower speed than part 15B. Thus in this case only the front wheels will transmit reverse torque to the engine.

In the modification shown in FIG. 2, parts similar to those described with reference to FIG. 1 are designated with the same reference numerals with the addition of the suffix $x$. In this case, one-way clutch 29$x$ is positioned in the front propeller shaft 11$x$ which is formed in two separate parts, a front part 11A and a rear part 11B. The operation of this construction is similar to that above described, except that the rear wheels 14$x$ only transmit torque to the engine in the event that all four wheels overrun. The one-way clutch 20*x* locks to prevent the rear part 11B from increasing in speed when over-running of the front wheels 18*x* occurs.

A further modification is shown in FIG. 3 wherein parts similar to those described with reference to FIG. 1 are given the same reference numerals with the addition of the suffix ('). In this case, one-way clutches 29' and 29A' are provided, one in both the front and the rear driving connections, so that no torque is transmitted from either pair of road wheels to the engine.

An alternative to the modification shown in FIG. 3 is illustrated by FIG. 4 wherein the suffixe (") is added to reference numerals corresponding to those used in FIG. 1. In this case, a single one-way clutch 50 is provided between the engine and the controlled differential.

The centre differential may be of any convenient controlled type. Also, the one-way clutch provided in the driving connections may be in the form of two one-way clutches, one in each half shaft.

If desired, means may be provided to enable the one-way clutches to be locked; this would, for example, enable the vehicle to utilise a reversing gear for driving in the reverse direction. Such an arrangement is shown diagrammatically in FIG. 5 wherein a one-way clutch 51 is locked by means of well-known co-operating locking members 52 and 53, the locking member 52 being slidable to a position in which the clutch 51 is unlocked. (See arrow "A" in FIG. 5).

Although the invention has been described with reference to a four wheel drive vehicle, it is applicable to any vehicle having two or more pairs of driven wheels, and the term "all wheel drive vehicle" used herein is intended to embrace such vehicles.

We claim:

1. A vehicle transmission for an all wheel drive vehicle having an engine, said engine having an output, and said transmission having a centre differential having an input and two outputs and means to limit difference in speed between said last mentioned two outputs to a predetermined value, a first driving connection between the engine output and the centre differential input, a front differential gear having two outputs adapted to be respectively drivingly connected to a pair of front ground wheels, a rear differential gear having two outputs adapted to be respectively drivingly connected to a pair of rear ground wheels, a front driving connection between the front differential gear and one output of the centre differential gear, a rear driving connection between the wear differential gear, and the other output of the centre differential gear, and one-way clutch means in at least one of said driving connections which disengages when the vehicle wheels overrun the engine, so that at least one pair of road wheels is prevented from transmitting torque back to the engine.

2. A vehicle transmission according to claim 1, in which said one-way clutch means comprises a one-way clutch positioned in the rear driving connection between the rear differential gear and the centre differential gear, so that when the vehicle wheels overrun the engine, only the front road wheels may transmit torque back to the engine.

3. A vehicle transmission according to claim 1, in which said one-way clutch means comprises a one-way clutch positioned in the front driving connection between the front differential gear and the centre differential gear, so that, when the vehicle wheels overrun the engine, only the rear road wheels may transmit torque back to the engine.

4. A vehicle transmission according to claim 1, in which said one-way clutch means comprises first and second one-way clutches, the first one-way clutch being positioned in the rear driving connection between the rear differential gear and the centre differential gear, the second one-way clutch being positioned in the front driving connection between the front differential gear and the centre differential gear, so that, when the vehicle wheels overrun the engine, none of the road wheels may transmit torque back to the engine.

5. A vehicle transmission according to claim 1, in which said one-way clutch means comprises a one-way clutch positioned in said first driving connection, so that, when the vehicle wheels overrun the engine, none of the road wheels may transmit torque back to the engine.

6. A vehicle transmission according to claim 1 including locking means connected to the one-way clutch means and operable so as to place the latter in a locked condition so that the ground wheels may be driven in reverse.

References Cited

UNITED STATES PATENTS

| | | | |
|---|---|---|---|
| 2,959,237 | 11/1960 | Hill | 180—44 |
| 3,235,021 | 2/1966 | Hill | 180—44 |

FOREIGN PATENTS 727,917  4/1955  Great Britain.

A. HARRY LEVY, *Primary Examiner.*